Feb. 8, 1944.    F. W. WILDEBOOR ET AL    2,340,849
LAWN MOWER
Filed Oct. 22, 1941
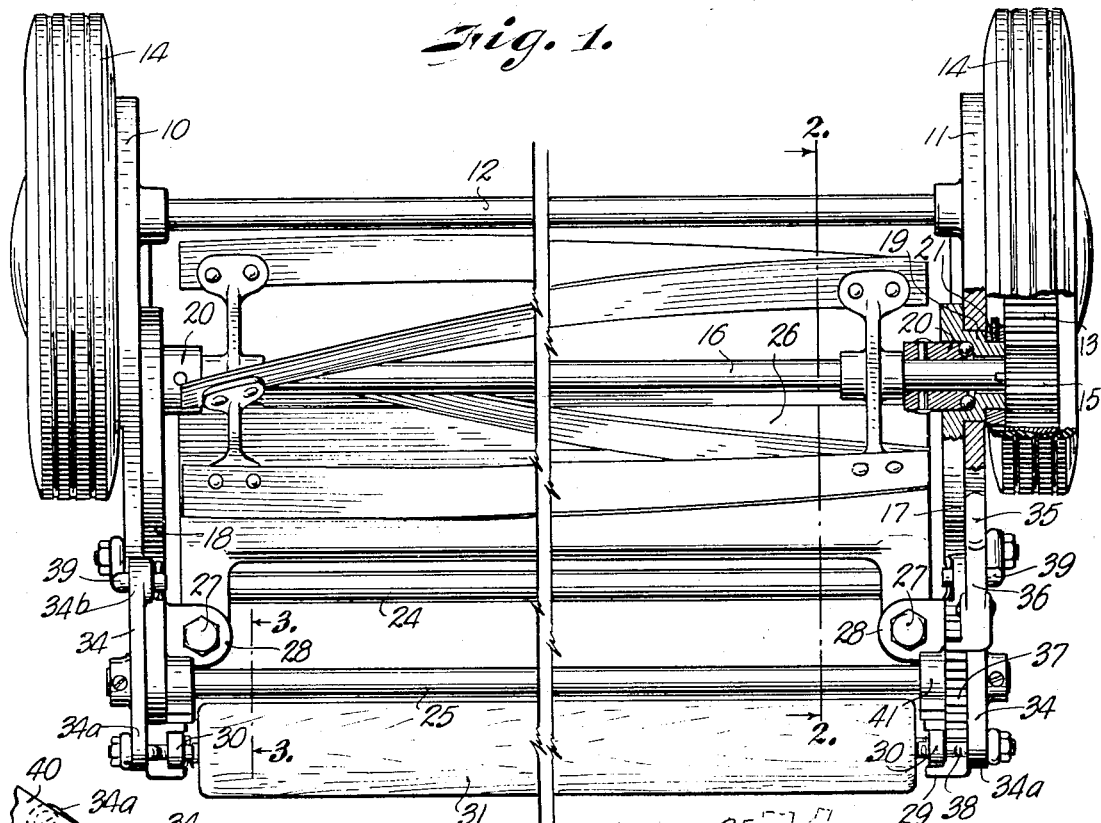
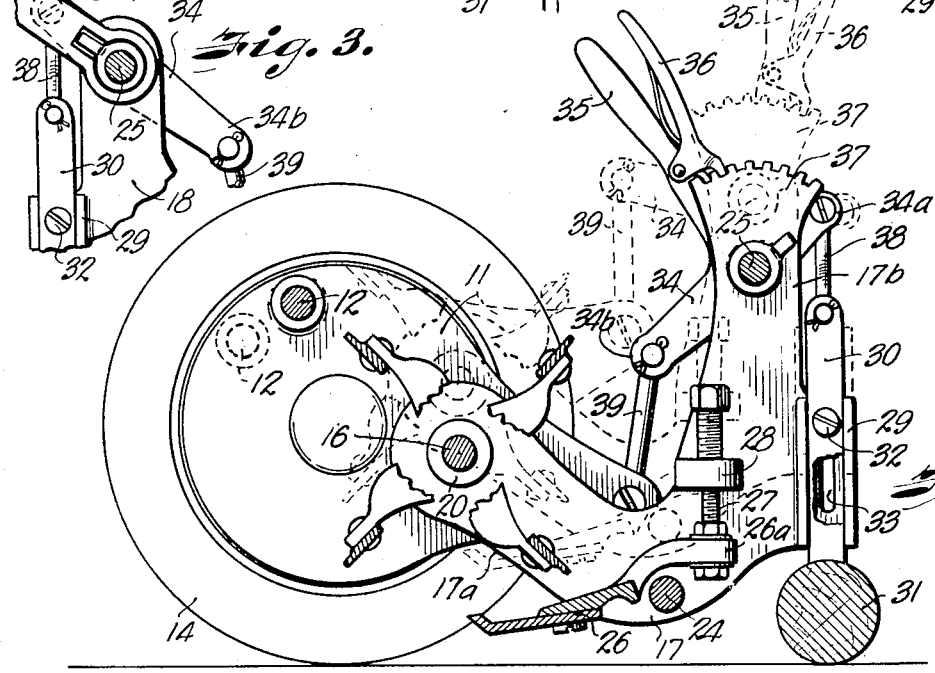
INVENTORS.
Frank W. Wildeboor
Marvin A. Doughty
BY Thos. E. Scofield
ATTORNEY.

Patented Feb. 8, 1944

2,340,849

UNITED STATES PATENT OFFICE 2,340,849

LAWN MOWER

Frank W. Wildeboor, Independence, and Marvin A. Doughty, Kansas City, Mo.

Application October 22, 1941, Serial No. 416,076

2 Claims. (Cl. 56—249)

Our invention relates broadly to new and useful improvements in lawn mowers and more particularly to means for vertically adjusting the cutter bar and reel of the mower in a manner to maintain the cutting edge of the cutter bar directly below the axis of the reel in all adjusted positions.

Conventional lawn mowers are provided with a rotating reel having a plurality of knives which cooperate with a cutter bar to cut grass. The most efficient cutting of the grass is obtained when the cutting edge of the cutter bar is in vertical alignment with the axis of the reel. In the conventional mower, the cutting reel and bar are mounted between side plates which rotatably support traction wheels. Rearward extensions of the side plates carry a vertically adjustable roller. Vertical adjustment of the cutting elements is obtained by raising or lowering the roller. However, lowering of the roller to raise the cutting elements causes the cutter bar to move to a position rearwardly of the axis of the cutting reel. As the cutting edge of the bar moves rearwardly of the reel axis, the cutting action becomes progressively less efficient. In this position of the cutting elements, the rotating knives move downwardly and contact the grass a substantial distance in advance of the cutter bar and a poor cutting action is obtained. Therefore, when the mower is adjusted to cut the grass relatively long, the cutter bar is disposed a substantial distance rearwardly of the reel axis and after the grass has been cut, the surface of the lawn is ragged and uneven.

An important object of our invention is to provide a lawn mower wherein the cutting elements may be vertically adjusted to maintain the cutting edge of the cutter bar directly below the axis of the reel in all adjusted positions.

Another object of our invention is the provision of a lawn mower of the above mentioned character wherein the cutting elements may be adjusted by a single actuator.

Still another object of our invention is to provide a lawn mower of the above mentioned character that is simple in its construction, inexpensive to manufacture and efficient in operation.

Other objects and advantages of our invention will be apparent during the course of the following description.

In the drawing forming a part of this specification and wherein like numerals are employed to designate like parts throughout the same, Fig. 1 is a top plan view of a device embodying our invention, showing parts in section and parts in elevation for clearness of illustration, Fig. 2 is a transverse sectional view taken on the line 2—2 of Fig. 1, and Fig. 3 is a fragmentary transverse sectional view taken on the line 3—3 of Fig. 1.

In the drawing, which shows a preferred embodiment of our invention, the numerals 10 and 11 designate side plates held in fixed spaced relation by a rod 12. Each of the side plates is formed with a centrally located hub in which the axle of a ground engaging traction wheel 14 is journaled. A cutting reel 16 is mounted for rotation between the side plates and the wheels are provided with internal ring gears 13 which mesh with pinions 15 at each end of the cutter reel spindle. The reel is of conventional shape and construction and is disposed eccentrically between the side plates in the conventional manner.

Essentially L-shaped supports 17 and 18 are pivotally mounted on the inner sides of the plates 10 and 11, by means of bosses 19 journaled in openings in the side plates. The ends of the reel spindle extend through the bosses to position the pinions 15 in mesh with the internal ring gears 13. Bearings 20, positioned adjacent the ends of the spindle, extend into sockets in the supports and provide a substantially frictionless mounting for the reel. The bosses 19 may rotate within plate openings but are prevented from lateral movement by collars 21. The reel spindle and rod 12 cooperate in holding the plates in fixed, spaced-apart relation.

Referring to Fig. 2, the portions of supports 17 and 18 pivoted at the reel spindle and extending rearwardly thereof are designated as 17a and 18a. The vertical portions of the supports 17 and 18 are designated as 17b and 18b. Rods 24 and 25, bridging the supports, rigidly hold the same in spaced relation. Mounted between members 17a and 18a and below the cutting reel is a cutter bar 26 which cooperates with the knives of the reel in cutting grass. The ends of the bar are provided with rearwardly extending brackets 26a. Adjusting screws 27 carried by lugs 28 furnish a means for adjusting the brackets. Rotation of the adjusting screws 27 raises or lowers the bar 26 relative to the knives of the cutting reel so that the cutting edge of the blade may be positioned to properly cooperate therewith.

Arms 17b and 18b of the supports have guideways 29 at their lower ends in which the vertical guide arms 30 of the supporting roller 31 are slidably mounted. Threaded studs 32 on guide arms 30 extend through slots 33 in the guideways and carry nuts which hold the guide arms in the guideways. The nuts are normally loose so that the arms are freely slidable. If desired, however, the nuts may be tightened on the studs to securely hold the guide arms in the guideways.

In order to simultaneously adjust the supports 17 and 18 we, attach an actuating lever 34 at each end of the rod 25. One of the levers is formed with an integral handle 35. The handle 35 carries a pawl 36 which meshes with rack 37 formed in the upper edge of the support. Thus, the lever 34 and its associated mechanism is held in any selected position. When pawl 36 is disengaged from the rack, the handle may be easily moved to rock levers 34. Ends 34a of levers 34 are connected by links 38 to the guide arms 30 and the ends 34b thereof are connected by links 39 to rearward extensions of the side plates 10 and 11.

The mower is operated by a handle (not shown). The handle is attached to the mower by a fork one end of which is fragmentarily shown at 40 in Fig. 3. It will be noted that the handle is attached to bosses 41 on the supports 17 and 18 instead of to the side plates as in the conventional manner.

The solid lines in Fig. 2 illustrate the reel and cutter bar in a lowered position and the dotted lines illustrate the cutting mechanism in a raised position. When the handle 35 is moved forwardly, the levers 34 rotate the side plates 10 and 11 on the ground wheel axles and permit the supports to slide downwardly on the guide arms 30. In this position the cutting mechanism is disposed to cut the grass relatively short by reason of its eccentric mounting on the side plates.

When the handle 35 is moved rearwardly to the dotted line position in Fig. 2, the levers 34, through links 39, rotate the side plates in an opposite direction and slide the supports 17 and 18 upwardly on the guide arms 30. When the rearward extensions of side plates 10 and 11 are swung upwardly the ends 17a and 18a of the eccentrically mounted supports 17 and 18 will be raised. There is a consequential movement of the members 17b and 18b upwardly on the guide arms. Thus, the supports are raised vertically without tilting and the cutting edge of bar 26 is at all times in vertical alignment with the axis of the reel. This makes for optimum cutting conditions as contrasted with the conventional manner of raising and lowering the cutting mechanism. In the dotted line position the cutting mechanism is raised to cut the grass relatively long. In all positions the pawl 36 will engage rack 37 and securely hold the parts against displacement.

Obviously, a number of intermediate adjustments are provided by the teeth of the rack 37. In any adjusted position of the levers, the cutting edge of cutter bar 26 will be disposed in vertical alignment with the axis of the reel 22 and the knives of the reel will therefore contact the cutter bar in its most efficient cutting position.

It is to be understood that the form of our invention herewith shown and described is to be taken as a preferred example of the same and that various changes in the size, shape and arrangement of parts may be resorted to without departing from the spirit of our invention or the scope of the appended claims.

Having thus described our invention, we claim:

1. In a lawn mower having rotatable side plates, a cutting reel and bar assembly, means for adjusting the reel and bar assembly relative to the ground while maintaining the same in vertical relationship comprising supports pivoted to the side plates carrying the reel and cutter bar, a roller having guide arms, guides on the supports in which the guide arms are slidably received, adjusting means carried by the supports and operatively connecting the side plates and the guides, said means being operative to simultaneously rotate the side plates and shift the supports along the guide arms, the arrangement being such that the supports will be moved along the guide arms substantially equal to the distance that the pivots of the supports are vertically moved by the rotation of the side plates.

2. In a lawn mower having rotatable side plates and a cutting reel and bar assembly, means for adjusting the reel and bar assembly relative to the ground while maintaining the same in vertical relationship comprising supports eccentrically pivoted to the side plates and carrying the reel and cutter bar, a roller having guide arms, guides on the supports in which the guide arms are slidably received, adjusting means carried by the supports positioned rearwardly of the eccentric support pivots and operatively connecting the side plates and the guides, said means being operative to simultaneously rotate the side plates and shift the supports along the guide arms, the arrangement being such that the supports will be moved along the guide arms a distance substantially equal to the distance that the eccentric pivots of the supports are vertically moved by the rotation of the side plates.

FRANK W. WILDEBOOR.
MARVIN A. DOUGHTY.